May 23, 1939.    A. M. BABITCH    2,159,196
METAL PLATE FILTER
Filed Sept. 25, 1937    2 Sheets-Sheet 1
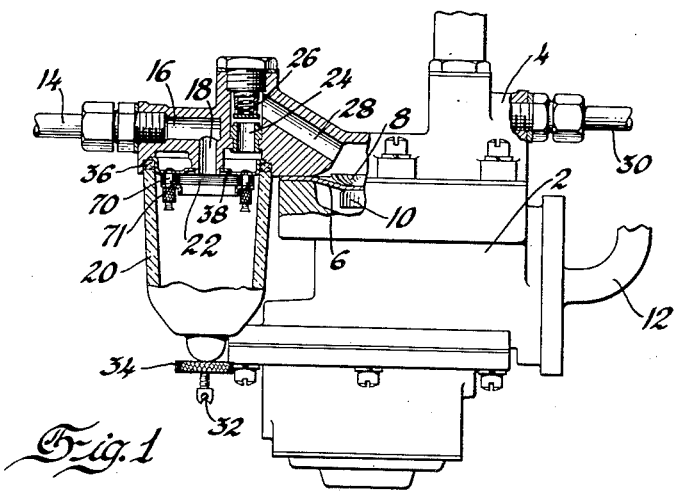
Fig. 1
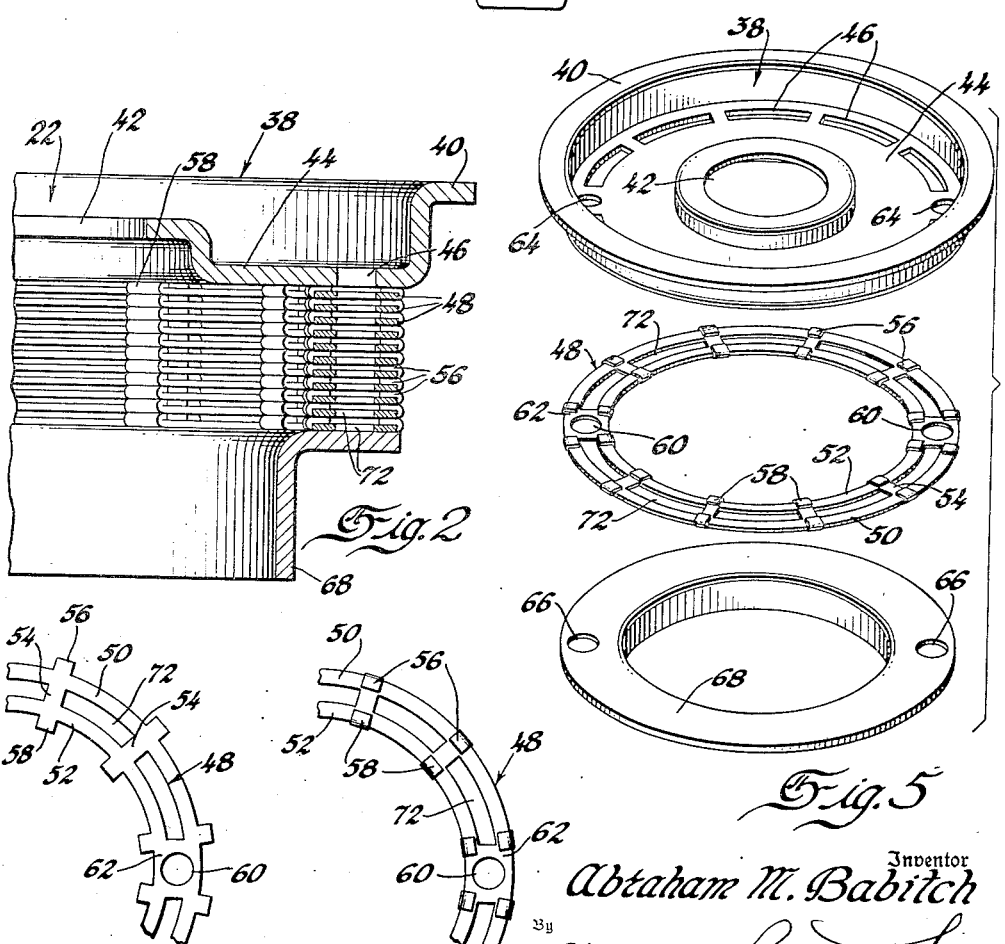
Fig. 2
Fig. 3
Fig. 4
Fig. 5
Inventor
Abraham M. Babitch
By Blackmore, Spencer & Hirst
Attorneys May 23, 1939.  A. M. BABITCH  2,159,196
METAL PLATE FILTER
Filed Sept. 25, 1937    2 Sheets-Sheet 2
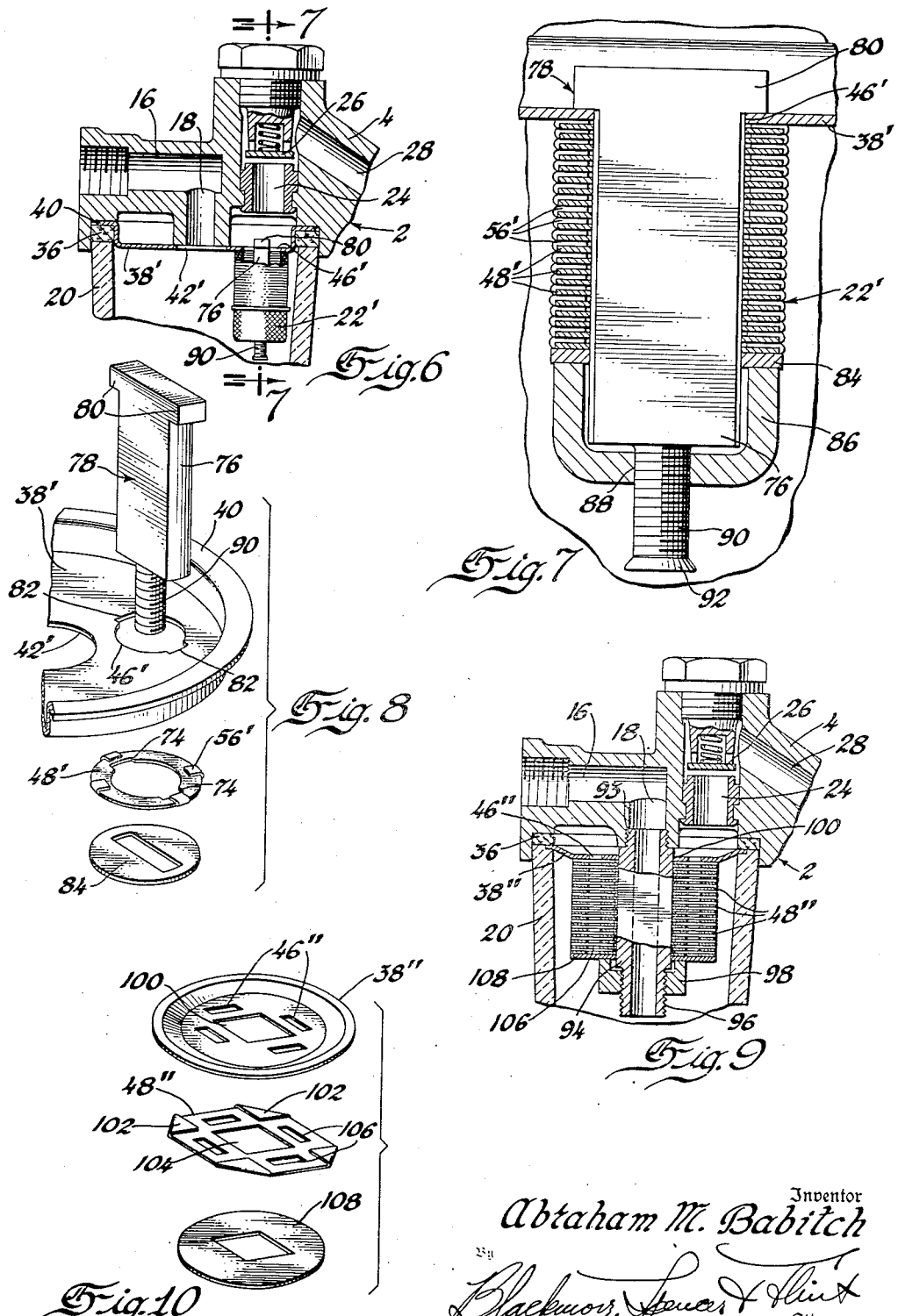
Inventor
Abraham M. Babitch Patented May 23, 1939

2,159,196

UNITED STATES PATENT OFFICE 2,159,196

METAL PLATE FILTER

Abraham M. Babitch, Flint, Mich., assignor to General Motors Corporation, Detroit, Mich., a corporation of Delaware Application September 25, 1937, Serial No. 165,691

10 Claims. (Cl. 210—169)

This invention relates to filters and has particular reference to a gasoline filter of the edge type.

The filter is adapted for installation in the usual gasoline bowl which is attached to the fuel pump used on internal combustion engines used in connection with automotive vehicles. The specific novelty of the invention relates to details of construction of the filtering plates and their assembly and mounting to form the filter.

On the drawings

Figure 1 is a side view of a fuel pump with parts shown in section to illustrate the application of the invention.

Figure 2 is an enlarged sectional detailed view through a part of the filter.

Figure 3 is a partial elevational view of one of the filtering plates at one stage of their manufacture.

Figure 4 is a view similar to Figure 3 of one of the filtering plates in the later stage of its manufacture.

Figure 5 is a separated or expanded view of the filter shown in Figure 2 with but one of the filtering plates shown.

Figure 6 is a sectional view similar to Figure 1 showing a modification.

Figure 7 is an enlarged sectional detailed view on the line 7—7 of Figure 6.

Figure 8 is an expanded or separated view of the parts of the filter with but one of the filter plates shown.

Figure 9 is a view similar to Figures 1 and 6 of a further modification.

Figure 10 is an expanded view of the filter of Figure 9 with but one of the filter plates shown.

Referring to the drawings, the numeral 2 indicates a fuel pump provided with a head 4 and a diaphragm 6. The diaphragm is positioned between the two cup-shaped operating elements 8 and 10 which in turn are operated from the arm 12, the end of which is in contact with a cam on the camshaft of the engine. The general structure of a fuel pump of this type is well known and needs no further explanation.

The fuel from the fuel reservoir enters at the pipe 14 and passes through the passages 16 and 18 into the fuel bowl 20. The fuel passes through the filter 22 and out through the passage 24 and past the one-way check valve 26 and into the passage 28 from where it is forced by the diaphragm 6 of the pump to the outlet pipe 30 to the carburetor.

The fuel bowl 20 is made of glass and is removable. The bowl is held to the fuel pump head 4 by means of a U-shaped wire 32 the ends of which are bent at right angles and secured in suitable openings in the fuel pump head. By turning the knurled nut 34 the bowl 20 can be tightened against the gasket 36 to form a liquid tight connection. The structure of the bowl 20, the U-shaped clip 32, and its connection with the fuel pump, is well known in the art and per se forms no part of the invention.

The filter 22 comprises the top plate 38 having the peripheral flange 40 which is seated between the gasket 36 and the head 4 of the fuel pump. The plate 38 has the enlarged central opening 42 which mates with the passage 18 to allow the entrance of fuel. The plate is also provided with the depressed annular part 44 which is provided with a plurality of fuel exit openings 46.

The filtering rings 48 of the invention are formed into a stack as shown in Figure 2 and applied to the underside of the depressed part 44 of the plate 38. One of the filtering rings is shown in detail in Figure 5 and two of the stages of the manufacture of the ring are shown in Figures 3 and 4. The rings are formed of thin sheet metal and are stamped as shown in Figure 3 and comprise the outer narrow ring part 50 and the inner narrow ring part 52. The rings 50 and 52 are connected by the integral connector elements 54 and in line with the connector elements 54 are the outer tabs 56 and inner tabs 58. These tabs are short and of a length corresponding substantially to the width of the rings 50 and 52. The tabs 56 are bent inwardly on the outer ring 50 while the tabs 58 are bent outwardly on the inner ring 52 as is shown in Figure 4. As many tabs 56 and 58 as desired may be used and in the illustration ten such tabs are shown. These tabs form the spacing means between adjacent filtering rings 48.

At diametrically opposite points on the filtering rings 48, openings 60 are provided. A solid part 62 is provided in the filtering rings in order that the openings 60 may be made. These openings 60 mate with openings 64 in the plate 38 and openings 66 in the bottom closure ring 68 and are for the passage of bolts 70 to secure the parts 38, 48, and 68 together or in the relation shown in Figure 2. Cup-like nuts 71 screwed on the bolts 70 hold the parts in place. For the detailed structure of the nut 71 and the end of the bolt 70 see parts 86, 90 and 92 of Figure 7. Tabs 56 and 58 are spaced considerably closer at the holes 60. This is done in order to have the nuts 71 press against the tabs and prevent laminations 68 from buckling under pressure as the case would have been if the tabs were equally spaced.

The inner and outer rings 50 and 52 and the connector members 54 define the arcuate openings 72 in the filter rings which openings mate with the openings 46 in the plate 38 and allow the exit of fuel.

The operation of the filter is as follows: the fuel will enter as previously described through the passages 14, 16, 18, and 42 into the bowl 20. From the bowl 20 the fuel will pass through the spaces between the adjacent plates both from the inside and outside of the filter plates 48 and enter the fuel openings or passages 72 in the filter plates. From the passages 72 the fuel will pass from the openings 46 and into the passage 24, past the valve 26, and into the passage 28 to the chamber above the diaphragm 6 of the fuel pump. The space produced by the tabs 56 between the adjacent plates 48 is very thin and will allow the passage of liquid such as gasoline but will retain at the edge any impurity or grit which may be in the fuel.

In the species of Figure 6 the parts corresponding to the species of Figure 1 are given the same numbers. In this species the plate 38' differs from the plate 38 in that there is no centrally placed part corresponding to the part around the opening 42 in Figure 2. The bottom of the plate has the opening 42' to allow the entrance of fuel while the filler 22' is secured inside the bowl at the bottom of the opening 46' in the plate 38'. The details of the filter are best shown in Figures 7 and 8. The filter plates are shown in detail at 48' in Figure 8. Each filter plate is much smaller than the plates shown in Figure 2 and comprises a ring or metal which has the exterior tabs 56' inwardly bent over the filtering ring to form spacers between adjacent rings. On the inner periphery of the ring recesses 74 are provided, these recesses being for the reception of the sides 76 of a retainer member 78 more or less in the shape of a bolt. The retainer member 78 is flat and has the projections 80 at its top which fit over the edge of the plate 38' adjacent the opening 46' as is best shown in Figure 7. The opening 46' is likewise provided with recesses 82 to receive the sides 76 and hold the bolt 78 and filter 22' in a definite position. As is best shown in Figure 7, the filtering rings 48' are assembled over the bolt 78 and held in position by the bolt. At the lower extremity of the stack of filtering rings 48' there is a washer 84 which is held in place by a cup 86 having a screw threaded opening 88 adapted to be screw threaded on the threaded shank 90 at the end of the bolt 78. The structural design of the cup 86 is counterbored to allow it to go over the retainer member 78 when the filter rings are in compressed position (see Figure 7). The length of the threaded shank 90 and the retainer 78 are so proportioned that when the nut 86 is backed up against the upset part 92, the washer 84 still remains on the smooth sides of retainer 78. This is desirable in order to allow easy sliding of the filtering elements in the process of cleaning. The end of the shank 90 has the enlarged conical part 92 to prevent the removal of the cup 86 and thereby prevent the filter elements from falling apart when the filter is removed for cleaning purposes. While but one filter 22' is shown as secured to the plate 38', it is nevertheless within the scope of the invention to use two or more filtering units 22'.

The operation of the filter is similar to that described in Figure 1. The fuel enters passages 16, 18, and 42' and enters the bowl 20. From the bowl 20 the fuel will pass between the filtering rings 48' and into the middle of the filter where the fuel will pass upward through the opening 46' through the pasages 24 and 28 into the fuel pump chamber.

Referring to Figures 9 and 10, another species of the invention is shown in which the parts corresponding to Figures 1 and 2 are similarly numbered. The opening 18 has its lower end screw threaded and receives the threaded end 93 of a tube 94, the lower end 96 of which is screw threaded to receive the nut 98. A plate 38'' is secured between the bowl 20 and the gasket 36 and is provided with a central opening 100 to receive the tube 94 and with a plurality of intermediate openings 46'' to allow the exit of fuel.

The filtering plates or rings are shown in detail at 48'' in Figure 10 and are stamped from thin sheets of metal. The filtering plates are rectangular in shape and have the corners 102 inwardly bent on the plate to form spacers between the adjacent filtering rings. Each ring is provided with the squared opening 104 to receive the squared tube 94 and with a plurality of smaller openings 106 mating with the openings 46' to allow the exit of fuel. A lower washer or plate 108 fits against the lowermost filtering ring and by tightening the nut 98 on the threaded end 96 the stack of filtering rings 48'' can be brought relatively closely in contact and cause the tabs 102 to leave a very narrow space between adjacent rings through which the liquid may pass.

The liquid enters through the pasasges 16 and 18 and the tube 94 into the bowl 20. From the bowl 20 the liquid passes to the outer periphery of the plates or rings 48'' and passes through the narrow passages between plates into the openings 106 and from the openings 106 the filtered liquid passes through the openings 46'' into the passages 24 and 28 into the diaphragm chamber of the fuel pump. Any impurities will be retained at the edge of the filter for the reason that they are unable to pass between the narrow spaces between the plates.

I claim:

1. In a liquid filter having a bowl removably secured in the path of the liquid, a mounting plate secured in position by the bowl, a retainer ring below the plate, a plurality of filtering rings of less diameter than the plate positioned between the plate and retainer ring, bent over tabs on the filtering rings to space one filtering ring from the other, and means passing through the retainer ring, the filtering means and the plate, to secure the filter in place, said filtering rings having a plurality of passages between their inside and outside diameters to allow the filtered liquid to pass through the filter.

2. In a liquid filter having a bowl removably secured in the path of the liquid, a plate secured in position by the bowl, said plate having a central opening to enable the entrance of fuel and a peripheral depression provided with a plurality of fuel exit openings, a plurality of superposed filtering rings forming a stack fitting against the depression and having tabs at their outward edges, said tabs being inwardly bent on the ring to form spacers between adjacent rings, said filtering rings having a plurality of fuel passages mating with the fuel passages in the plate, and means to close the passages in the outermost ring and secure the rings to the plate, said fuel passing from the inside and the outside peripheries of the filtering rings to the filter passages.

3. In a liquid filter having a bowl removably secured in the path of the liquid, a plate secured in position by the bowl, said plate having a central opening to enable the entrance of fuel and a peripheral depression provided with a plurality of fuel exit openings, a plurality of filtering rings forming a stack fitting against the depression and having tabs at their outward edges, said tabs being inwardly bent on the ring to form spacers between adjacent rings, said filtering rings having a plurality of fuel passages mating with the fuel passages in the plate, a closure ring fitting against the outermost filtering ring, and means passing through the closure ring, the filtering rings and the plate to secure the rings in filtering relation, the fuel passing from the inside and outside peripheries of the filter rings to the fuel passages in the filtering rings.

4. In a ring for an edge filter, a plurality of arcuate openings in the ring, said openings forming passages for the passage of liquid, tabs on the outer edge of the ring, said tabs being inwardly bent on the ring and forming spacers for the adjacent ring.

5. In a ring for an edge filter, a plurality of arcuate openings in the ring said openings forming passages for the passage of liquid, tabs on the inner edge of the ring, said tabs being bent toward and on the ring and forming spacers for the adjacent ring.

6. In a ring for an edge filter, a plurality of arcuate openings in the ring said openings forming passages for the passage of liquid, tabs on the inner and outer edges of the ring, said tabs being bent toward and on the ring and forming spacers for the adjacent ring.

7. In a ring for an edge filter, said ring comprising inner and outer narrow rings interconnected by integral connectors, tabs on the outer narrow ring at the connectors, said tabs being inwardly bent on the ring and forming spacers for the adjacent ring.

8. In a ring for an edge filter, said ring comprising inner and outer narrow rings interconnected by integral connectors, tabs on the inner narrow ring at the connectors, said tabs being bent toward and on the ring and forming spacers for the adjacent ring.

9. In a ring for an edge filter, said ring comprising inner and outer narrow rings interconnected by integral connectors, tabs on the inner and outer rings at the connectors, said tabs being bent toward and on the ring and forming spacers for the adjacent ring.

10. In a filter having a plurality of spaced metal plates to form the filtering element, means passing through the plates to hold them in assembled relation, a threaded shank on said means, said shank extending beyond the plates, a cup-shaped nut threaded on said shank and adapted to be screwed against the endmost plate to hold the plates together in spaced relation, and an enlarged head on the end of the shank to prevent the removal of the nut, said nut capable of being unscrewed to the enlarged end to cause the release and separation of the plates to enable the cleaning of the filter.

ABRAHAM M. BABITCH.